US012637231B1

(12) United States Patent
Addis et al.

(10) Patent No.: US 12,637,231 B1
(45) Date of Patent: May 26, 2026

(54) SLIDING BARRIER SYSTEM FOR AN AIRCRAFT

(71) Applicant: The Boeing Company, Arlington, VA (US)

(72) Inventors: Paul James Saum Addis, Bothell, WA (US); Justin Limbo Tabora, Bothell, WA (US); Gregory Allen Tubbs, Marysville, WA (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 19/199,660

(22) Filed: May 6, 2025

(51) Int. Cl.
B64D 45/00 (2006.01)
(52) U.S. Cl.
CPC .................................. B64D 45/0026 (2019.08)
(58) Field of Classification Search
CPC .......... B64D 11/0023; B64D 2011/004; B64D 45/0021; B64D 45/0026; B64D 45/0028
See application file for complete search history.

(56) References Cited

U.S. PATENT DOCUMENTS

2003/0189130 A1* 10/2003 Dovey ............... B64D 45/0028
244/118.5
2025/0304235 A1* 10/2025 Rhynard ............... B64C 1/1469

* cited by examiner

*Primary Examiner* — Timothy D Collins
*Assistant Examiner* — Justin Michael Heston
(74) *Attorney, Agent, or Firm* — COATS & BENNETT, PLLC

(57) ABSTRACT

A barrier assembly that is mounted at an opening in an interior of an aircraft. The barrier assembly includes first and second panels each with a notched corner. A hinge connects the first panel and the second panel along the inner edges. Fittings are connected to each of the panels and are movable relative to the panels between a between a retracted position that exposes the notched corner and an extended position that extends across the notched corner. The first panel and the second panel are movable between a stowed position and a deployed position. The stowed position includes the panels folded in an overlapping arrangement with the notched corners aligned. The deployed position includes the panels extended outward.

20 Claims, 14 Drawing Sheets

POSITIONING PANELS IN A STOWED POSITION AWAY FROM THE OPENING WITH THE PANELS FOLDED TOGETHER — 1100

SLIDING THE PANELS INTO THE OPENINGS — 1102

POSITIONING THE PANELS IN A DEPLOYED POSITION ACROSS THE OPENING — 1104

SLIDING BARRIER SYSTEM FOR AN AIRCRAFT

TECHNOLOGICAL FIELD

The present disclosure relates generally to the field of aircraft and, more specifically, to a barrier assembly configured to be used within a cabin area of the aircraft and that is movable between a stowed position and a deployed position.

BACKGROUND

Aircraft include a cabin area that is equipped to accommodate passengers. The cabin area includes seats for the passengers that are aligned in rows. One or more aisles enable passengers to move within the cabin area. Monuments including but not limited to lavatories and galleys are located in the cabin area. A flight deck is positioned at the front of the cabin area and is often separated from the cabin area by a flight deck door. The flight deck includes flight instruments, instrument panels, and various controls that enable the flight personnel to operate the aircraft.

Barrier systems are positioned in the cabin area to allow flight deck transfers. The barriers should be movable between a stowed position to enable persons to move along aisle, and a deployed position that extends across the aisle. In the stowed positions, the barriers should be positioned to enable persons to move along the aisle. Some existing barriers partially protrude into the aisle creating a potential tripping issue. These barriers can also interfere with persons moving suitcases and other luggage along the aisle. The relatively narrow width of the cabin area also poses an issue as there is a limited amount of space between the aisle and wall of the fuselage to store a barrier in the stowed position.

In some examples, the barriers should be configured to be deployed when the flight deck door is opened. This prevents an authorized person from moving along the aisle and entering the flight deck. The barrier should be configured to inhibit and/or sufficiently delay a person in the cabin area from reaching the flight deck door when the flight deck door is open. The delay in their movement towards the flight deck would allow the flight deck door to be closed and locked prior to the person reaching the door.

SUMMARY

One aspect is directed to a barrier assembly that is configured to be mounted at an opening in an interior of an aircraft. The barrier assembly comprises a panel with a notched corner. A fitting is connected to and movable relative to the panel between a retracted position that exposes the notched corner and an extended position that extends across the notched corner.

In another aspect, the notched corner is positioned between an upper edge and a lateral edge of the panel.

In another aspect, a biasing mechanism is attached to the panel and biases the fitting towards the extended position.

In another aspect, a lock is mounted to the panel and configured to maintain the fitting in the extended position.

In another aspect, the panel comprises a first side and a second side and wherein the fitting and the biasing mechanism are mounted to the first side of the panel.

One aspect is directed to a barrier assembly that is configured to be mounted at an opening in an interior of an aircraft. The barrier assembly comprises a first panel and a second panel comprising an inner edge and an edge with a notched corner. A hinge connects the first panel and the second panel along the inner edges. A first fitting is connected to and movable relative to the first panel and a second fitting that is connected to and movable relative to the second panel. The first fitting and the second fitting movable relative to their respective panel between a between a retracted position that exposes the notched corner and an extended position that extends across the notched corner. The first panel and the second panel are movable between a stowed position and a deployed position. The stowed position comprises the first panel and the second panel folded at the hinge and in an overlapping arrangement with the notched corners aligned. The deployed position comprises the first panel and the second panel extended outward and the notched corners positioned away from the hinge.

In another aspect, in the deployed position the notched corners are positioned along upper and outer edges of a barrier formed by the first and second panels.

In another aspect, a first biasing mechanism is attached to the first panel and that biases the first fitting towards the extended position, and a second biasing mechanism is attached to the second panel and biases the second fitting towards the extended position.

In another aspect, a first lock is mounted to the first panel and configured to maintain the first fitting in the extended position, and a second lock is mounted to the second panel and configured to maintain the second fitting in the extended position.

In another aspect, each of the first panel and the second panel comprise a first side and a second side and wherein the first fitting and the first biasing member are mounted to the first side of the first panel and wherein the second fitting and the second biasing member are mounted to the first side of the second panel.

One aspect is directed to a barrier assembly that is configured to be mounted at an opening in an interior of an aircraft. The barrier assembly comprises a first panel and a second panel that are pivotally connected together with each of the first panel and the second panel comprising a notched corner. Fittings are connected to the first panel and the second panel with the fittings movable relative to the panels between a retracted position that exposes the notched corner and an extended position that extends across the notched corner. Biasing members bias the fittings towards the extended positions. The first panel and the second panel are movable between a stowed position and a deployed position. The stowed position comprises the first panel and the second panel in an overlapping arrangement with the notched corners being aligned. The deployed position comprises the first panel and the second panel in a side-by-side arrangement to form a barrier with the notched corners positioned along upper and outer edges of the barrier.

In another aspect, the first panel and the second panel comprise a top edge and an angled edge that are each straight and with the top edge and angled edge aligned at an obtuse angle.

In another aspect, a hinge connects together the first and second panels along inner edges of the first and second panels.

In another aspect, the first panel and the second panel comprise a common shape and size.

In another aspect, rollers are connected to and positioned outward from the fittings to contact against a structural member above the first and second panels when the first and second panels are in the deployed position.

In another aspect, locks prevent the fittings from being moved from the extended position to the retracted position.

In another aspect, the locks comprise fingers that extend outward from inner edges of the first and second panels in the stowed position and that are retracted inward to engage the lock when the first and second panels are in the deployed position.

In another aspect, the fittings overlap with the respective first and second panels in the stowed position and the deployed position.

In another aspect, the fittings and the biasing mechanisms are positioned on forward sides of the first and second panels to prevent access to passengers on the aircraft sitting in a cabin area of the aircraft.

One aspect is directed to a method of using a barrier assembly within an opening in an interior of an aircraft. The method comprises: positioning panels of the barrier assembly in a stowed position away from the opening with the panels folded together with notched corners of the panels aligned together and positioned away from the opening and with fittings on the panels in retracted positions; sliding the panels into the opening and moving the fittings from the retracted positions towards extended positions over the notched corners; and positioning the panels in a deployed position across the opening with the panels extended outward and the fittings extending across the notched corners.

In another aspect, the method further comprises sliding the panels into the opening and moving rollers along a track and gradually moving the fittings over the notched corners.

In another aspect, the method further comprises sliding the panels into the opening and passively moving the fittings from the retracted positions towards the extended positions.

In another aspect, the method further comprises overlapping the fittings on the panels in the retracted positions with the fittings located away from the notched corners.

In another aspect, the method further comprises locking the fittings in the extended positions when the panels are deployed across the opening.

In another aspect, the method further comprises positioning the panels in a parallel arrangement in the stowed position.

The features, functions and advantages that have been discussed can be achieved independently in various aspects or may be combined in yet other aspects, further details of which can be seen with reference to the following description and the drawings.

DETAILED DESCRIPTION

Figure 1:
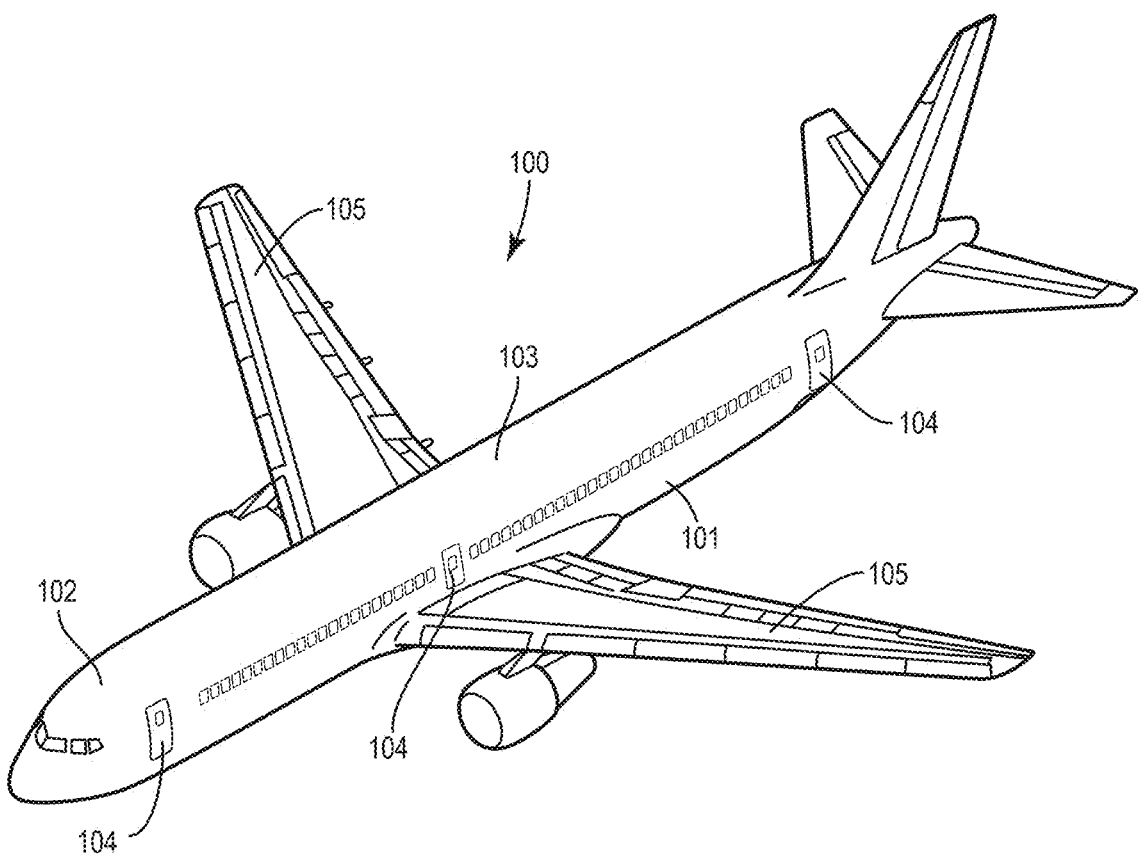
FIG. 1 is an isometric view of an aircraft.

FIG. 1 illustrates an aircraft 100 that generally includes a fuselage 101 and wings 105. A flight deck 102 is positioned at a front of the fuselage 101 and a cabin area 103 is positioned rearward. The cabin area 103 is equipped for accommodating passengers and/or cargo. The size of the flight deck 102 and the cabin area 103 can vary depending upon the aircraft 100. One or more exterior doors 104 provide for passengers and flight personnel to enter and exit the fuselage 101.

Figure 2:
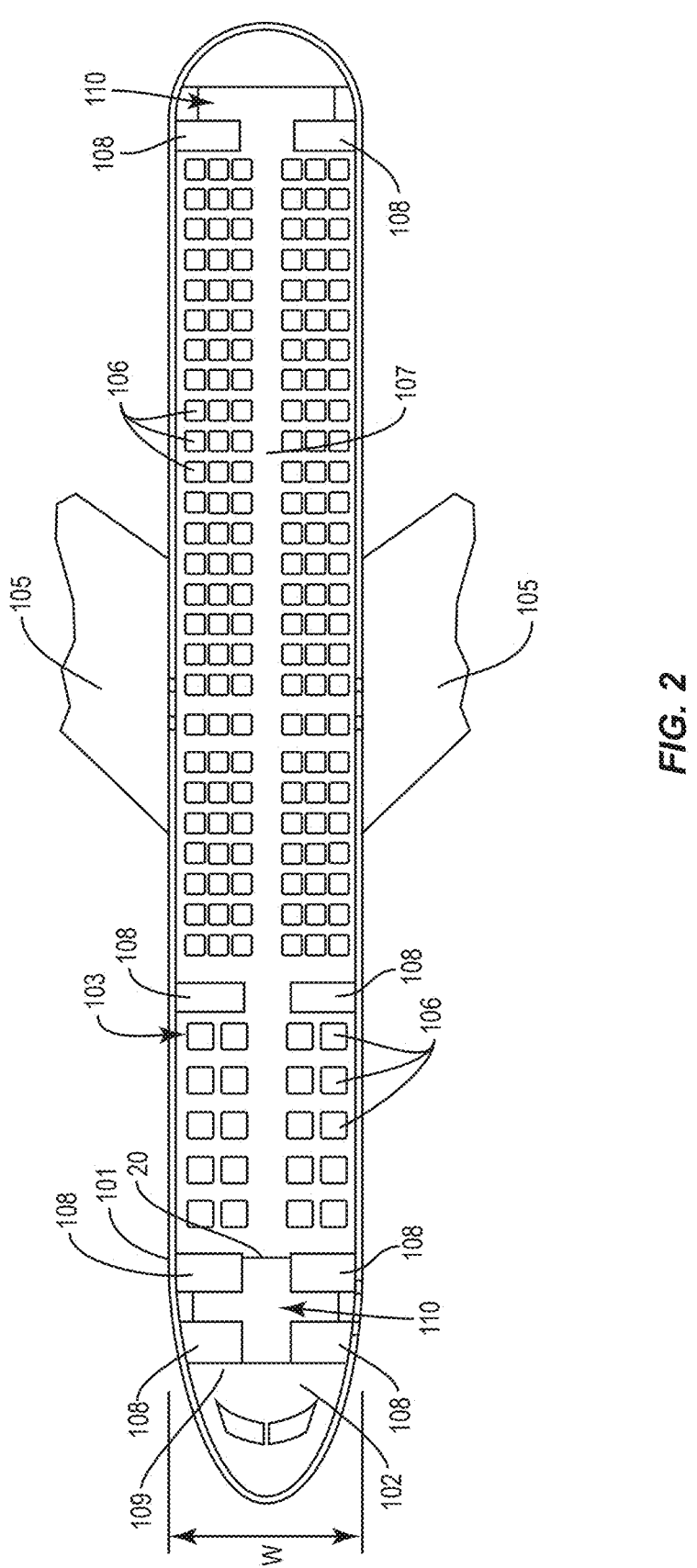
FIG. 2 is a schematic diagram of a cabin area of an aircraft that is equipped with one or
  more barrier assemblies.

FIG. 2 illustrates the cabin area 103 within the interior of the fuselage 101. The cabin area 103 is positioned along the fuselage 101 rearward of the flight deck 102. A flight deck door 109 secures the flight deck 102 from the cabin area 103. The cabin area 103 includes seats 106 arranged in rows. In some examples such as a commercial airline, the seats 106 extend throughout the cabin area 103. In other examples in which the aircraft 100 is used for cargo transport, a limited number of seats 106 are positioned in the cabin area 103. An aisle 107 extends along the cabin area 103. The example of FIG. 2 includes a single aisle 107 as the width W of this aircraft 100 is relatively narrow. In some examples, a single-aisle aircraft 100 is referred to as a narrow-body aircraft. In other examples, two or more aisles 107 extend along the cabin area 103 (referred to as wide-body aircraft).

The cabin area 103 also includes one or more monuments 108 that are mounted to the structural members of the aircraft 100. The monuments 108 are functional units with examples including but not limited to galley workstations, lavatories, walls, and stowage units. The monuments 108 form attendant areas 110 configured for attendants to sit and also prepare food and drinks for the passengers.

Figure 3:
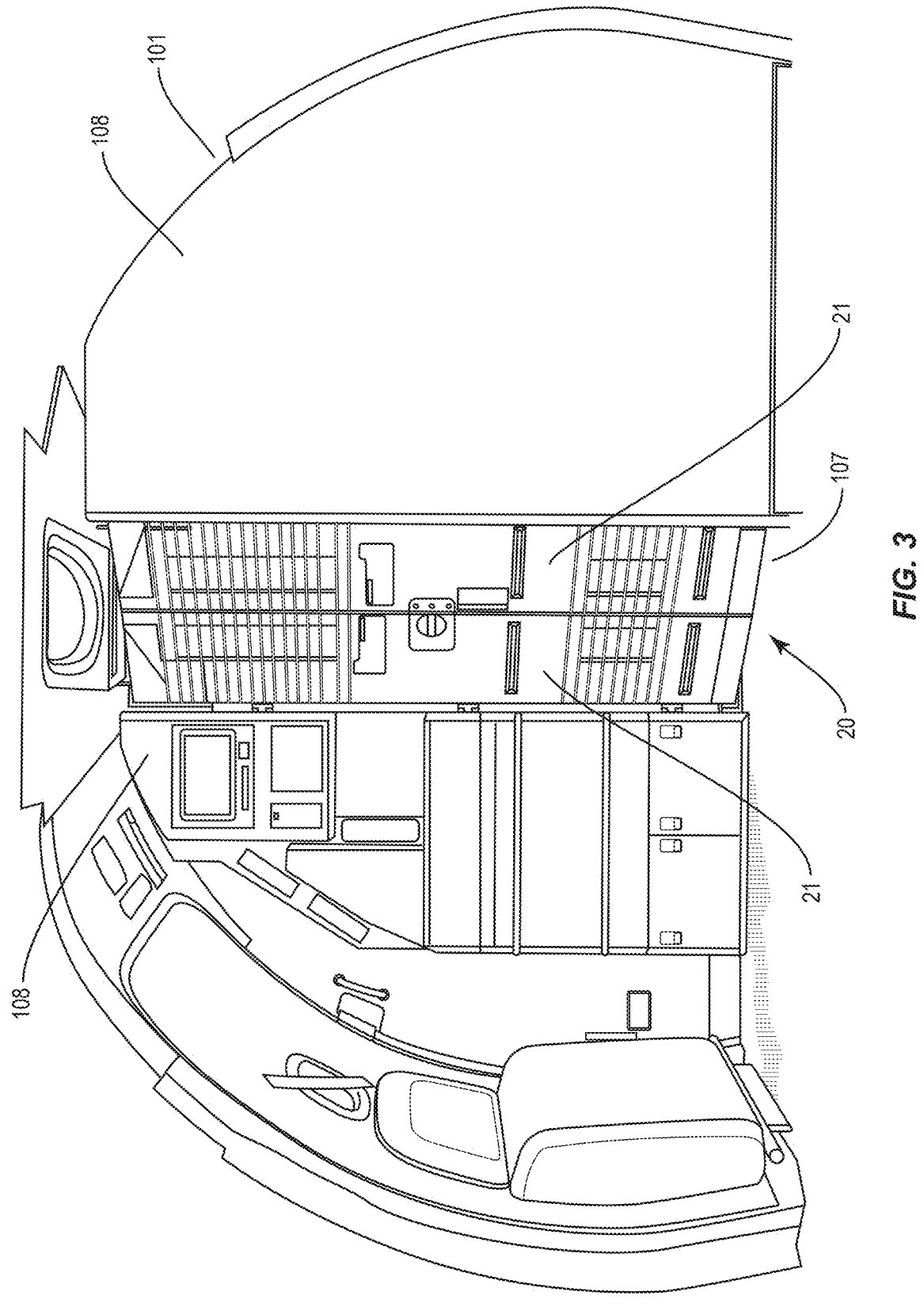
FIG. 3 is an isometric view of a barrier assembly with a barrier formed by panels in a deployed position across an opening on an aisle.

A barrier assembly 20 is positioned within the cabin area 103 to control the movement of passengers along the aisle 107. The barrier assembly 20 includes one or more panels 21 that are movable between a stowed position to enable persons to move along the aisle 107, and a deployed position to prevent the movement. In some examples, the barrier assembly 20 is mounted to one or more of the monuments 108. Additionally or alternatively, the barrier assembly 20 is mounted to other structures in the cabin area 103 such as but not limited to the floor, ceiling, and walls. FIG. 3 illustrates a barrier assembly 20 in a deployed position with panels 21 extending across an aisle 107. The barrier assembly 20 is positioned at an opening 90 that is formed between two monuments 108. The panels 21 are sized to prevent a person from passing through the opening 90. The panels 21 in the deployed position can be aligned at various angles relative to the aisle. In some examples, the panels 21 are substantially perpendicular to the aisle 107 with other examples including different angular alignments. In some examples, the panels 21 are configured to be positioned away from the opening 90 in the deployed position. This can include the panels 21 positioned in a pocket in a monument 108 or positioned flush against a side of the monument 108. In some examples, the panels 21 have the same shape and size. In other examples, the panels 21 have different shapes and/or sizes.

Figure 3A:
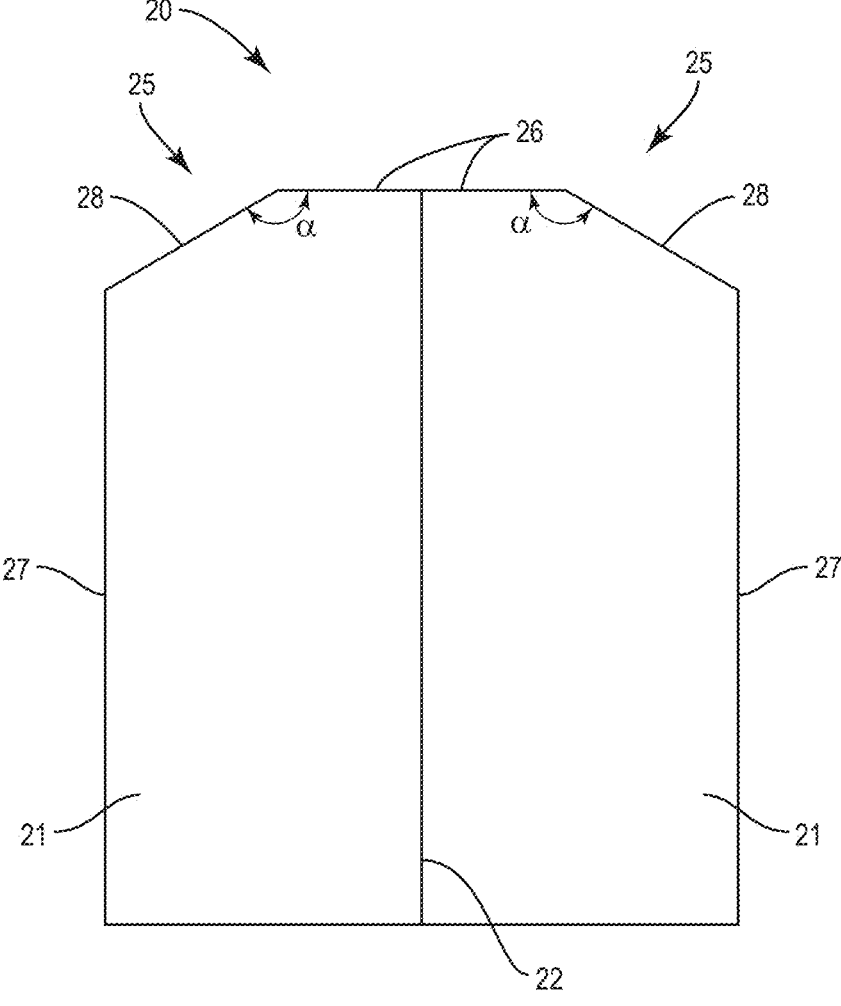
FIG. 3A is a schematic side view of a barrier with first and second panels each having a notched corner.

The distance between the aisle 107 and the wall of the cabin area 103 is small relative to the size of the panels 21. Further as illustrated in FIG. 3, the cabin area 103 has a partially circular sectional shape due to the substantially cylindrical shape of the fuselage 101. This can be problematic when storing a barrier out of the aisle in a stowed position. To address this issue, the panels 21 have a notched corner 25 formed by an angled edge 28 that extends between an upper edge 26 and an outer lateral edge 27. The notched corners 25 enable the panels 21 to conform to the shape of the cabin area 103 when the panels 21 are in the stowed position. In some examples as illustrated in FIG. 3A, the angled edge 28 is straight and extends between the upper edge 26 and the outer lateral edge 27. In other examples, the angled edge 28 has different configurations with the notched corner 25 have a variety of different shapes and sizes.

FIG. 3A illustrates panels 21 in a deployed position with the notched corners 25 positioned along outer lateral edges of the panels 21. The angled edge 28 is aligned at an angle α with the upper edge 26. In some examples, the angle α is an obtuse angle. This shape provides for the panels 21 to be stored in the deployed position out of the aisle 107 and to conform to the restricted space within the cabin area 103. The panels 21 are connected together at a hinge 22. The hinge 22 enables the panels 21 to be moved between the deployed position with the panels 21 aligned side-by-side in a common plane (as illustrated) and the stowed position with the panels 21 folded together in an overlapping arrangement. In the overlapping stowed position, the notched corners 25 align together and are positioned away from the aisle 107.

Figure 4:
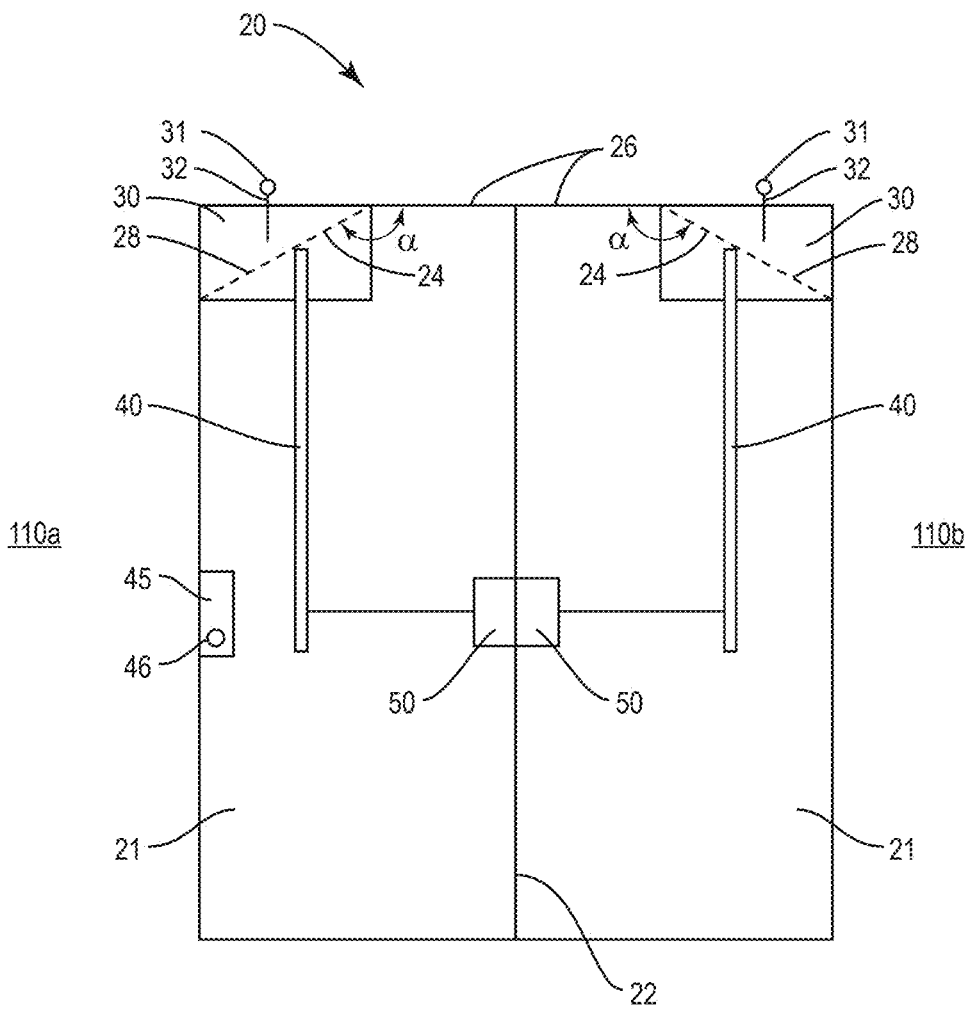
FIG. 4 is a schematic side view of a barrier assembly.

FIG. 4 illustrates the panels 21 in the deployed position. A fitting 30 is mounted to each of the panels 21 in proximity to the upper edge 26. The fittings 30 are movable relative to their respective panel 21 between a retracted position away from the notched corner 25 and an extended position as shown in FIG. 4 that fills the notched corner 25. The fittings 30 prevent a passenger from reaching their arm through the openings at the notched corners 25 and potentially opening the barrier assembly 20. In some examples, the fittings 30 are shaped to align with one or both of the upper edge 26 and outer lateral edge 27 when extended. In some examples, the fittings 30 are positioned along one side of the panels 21. In other examples, the fittings 30 are positioned in slots in the panels 21.

In some examples, the fittings 30 overlap with the panels 21 in both the extended position and the retracted position. In other examples, the fittings 30 overlap with the panels 21 in just the extended position.

The fittings 30 are biased towards the extended position by dampeners 40. The dampeners 40 include a biasing mechanism such as a spring to apply a force to the fittings 30. Rollers 31 are positioned along the top of the fittings 30. In some examples, the rollers 31 are positioned on arms 32 and extend outward beyond the top edge of the fittings 30. A lock 50 is configured to maintain the fittings 30 in the extended positions. A lock 45 is configured to engage with the monument 110*a* to secure the barrier in the deployed position. Lock 45 includes a handle 46 to move the lock 45 between locked an unlocked positions.

Figure 5:
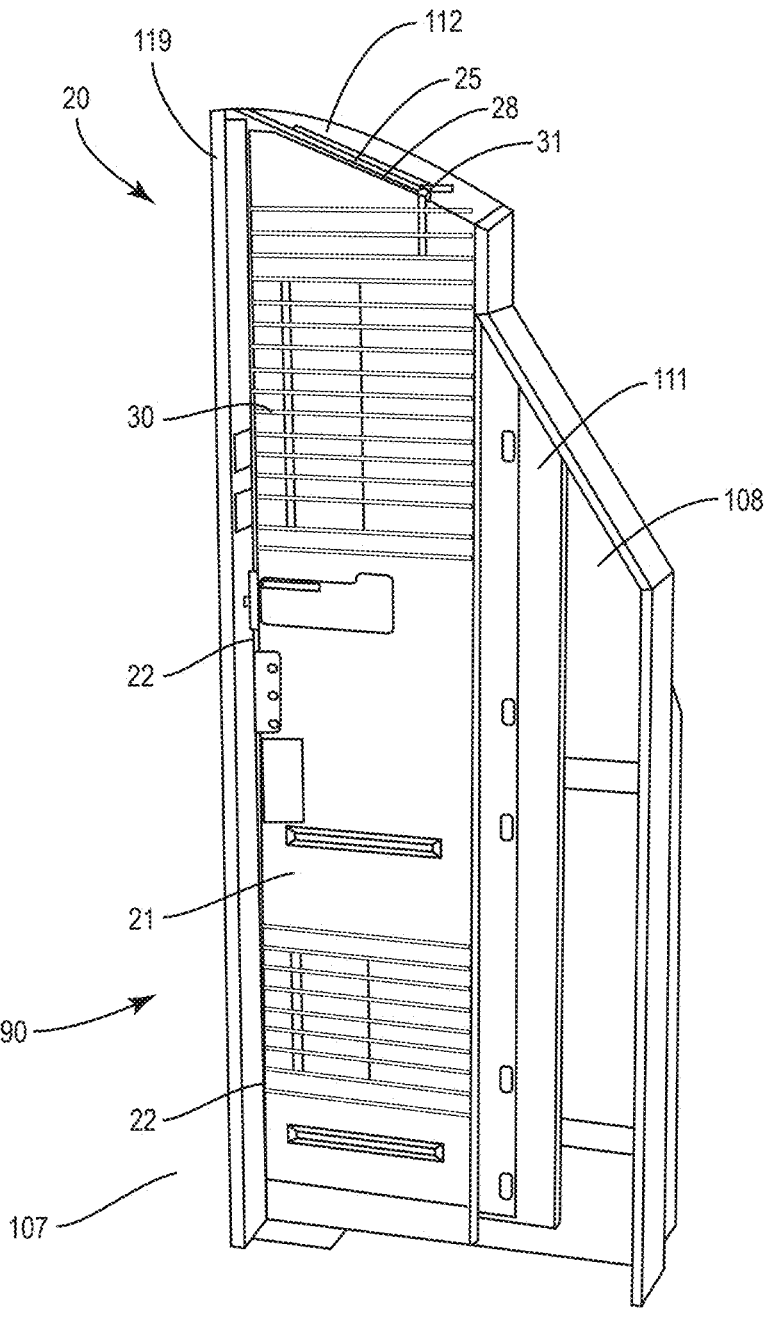
FIG. 5 is an isometric view of a barrier assembly in a stowed position with notched corners of the panels positioned away from an opening.

FIG. 5 illustrates the barrier assembly 20 in the stowed position within a pocket 111 of a monument 108. The pocket 111 is in communication with the opening 90 and is sized to receive the folded panels 21. The panels 21 are positioned away from the opening 90 to enable passengers to move along the aisle 107. In some examples, a cover plate 119 is mounted to the monument 108 and extends over the pocket 111 when the panels 21 are positioned in the pocket 111 in the stowed position.

The panels 21 are in an overlapping arrangement in the stowed position. In some examples, the panels 21 are aligned parallel to each other, with other examples the panels 21 aligned at a slightly non-parallel alignment. The panels 21 are positioned with the notched corners 25 aligned and positioned outward away from the opening 90. The cut-out corners 25 provide a shape that corresponds to the semi-circular shape of the fuselage 101 (see FIG. 3). This shape enables the panels 21 to be positioned in the pocket 111 and fully away from the opening 90 in the stowed position. The hinge 22 that connects the panels 21 is positioned towards the opening 90.

A track 112 extends along a top edge of the pocket 111. The track 112 angles upward towards the opening 90. The rollers 31 on the fittings 30 are in contact with the track 112 along the upper edge. This contact causes the fittings 30 to be retracted inward as the contact overcomes the forces applied by the dampeners 40. As the panels 21 are pulled out of the pocket 111 towards the deployed position, the rollers 31 ride along the track 112 causing the fittings 30 to move towards the extended positions.

Figure 6:
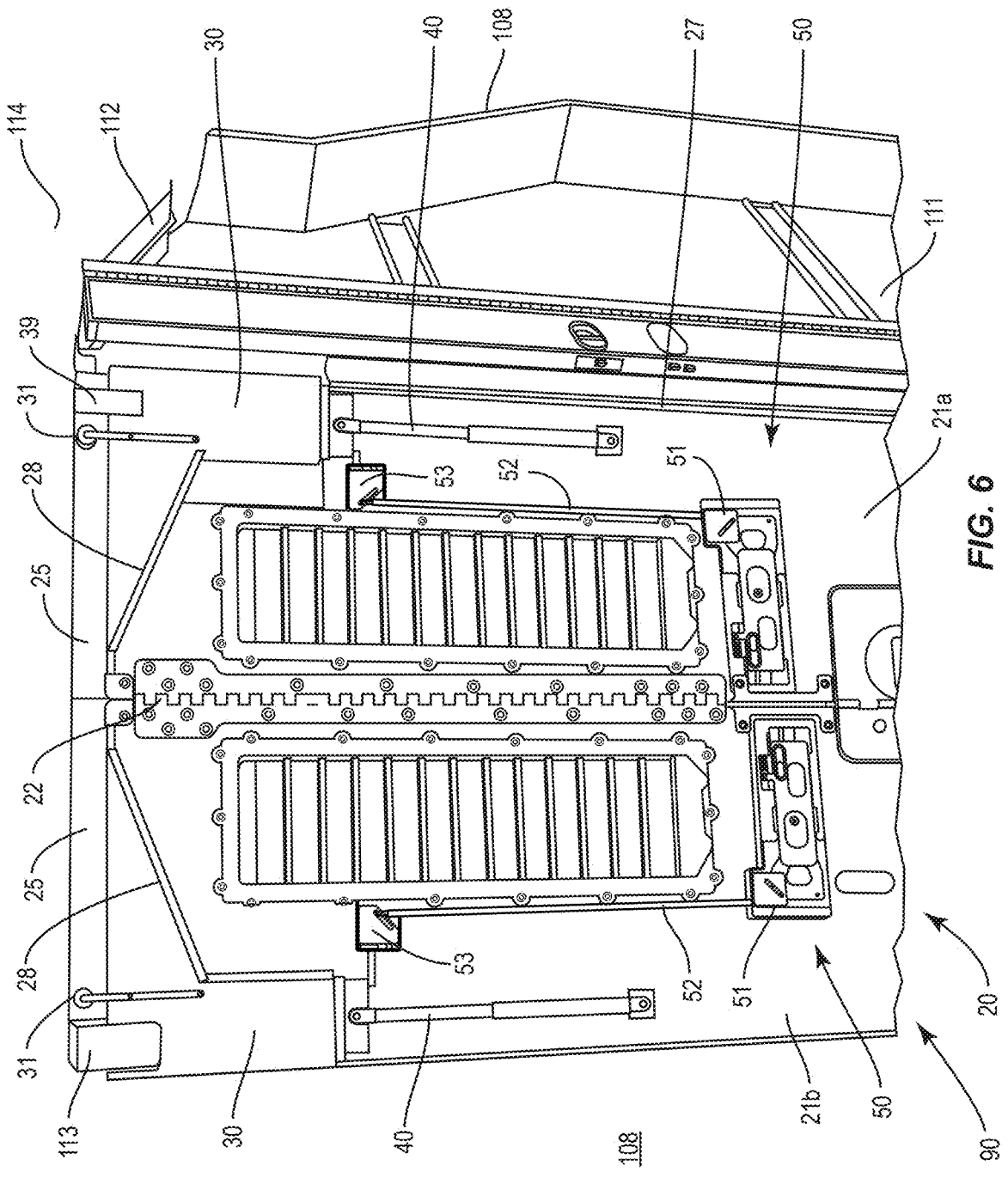
FIG. 6 is an isometric view of locks on the panels of a barrier assembly.

FIG. 6 illustrates the barrier assembly 20 in the deployed position with the panels 21 extending across the opening 90. The panels 21*a*, 21*b* are pivoted apart at the hinge 22 and aligned in a side-by-side alignment. In some examples, the second panel 21*b* is positioned in a connector 113 that is attached to the ceiling 114. The connector 113 includes a pair of fingers that are spaced apart by a gap. The second panel 21*b* is inserted into the gap while unfolding and moving towards the deployed position.

In the deployed position, the fittings 30 are biased upward in the extended positions into the notched corners 25. The dampeners 40 provide for passively moving the fittings 30 into the notched corners 25 by merely moving the barrier assembly to the deployed position. During deployment, the rollers 31 ride along the track 112 and then along the ceiling 114 to position the fittings 30 in the extended position. The extent of movement is limited by the rollers 31 contacting against the ceiling 114. Flight personnel are not required to actively deploy the fittings 30.

The dampeners 40 are configured to apply a biasing force to fittings 30. In some examples, the dampeners 40 include telescoping members with first ends connected to the panels 21 and second ends connected to the fittings 30. A spring is positioned within the interior of the telescoping members to apply the biasing force.

In some examples as illustrated in FIG. 6, one or more bearing fittings 39 support the barrier in the deployed position. The bearing fittings 39 include a pair of plates that are spaced apart by a gap. The bearing fittings 39 are configured to be mounted to the structural members of the aircraft 100 such as but not limited to the ceiling. FIG. 6 illustrates an example with a bearing fitting 39 positioned to receive the fitting 30 in the extended position. In some examples, the gap has a width that enables the roller 31 to pass through the gap during movement of the barrier to the deployed position. In some examples, a bearing fitting 39 is positioned to support each of the panels 21 of the barrier. In other examples as illustrated in FIG. 6, a limited number of panels 21 such as just the outboard panel 21 are supported by a bearing fitting 39.

Figure 6A:
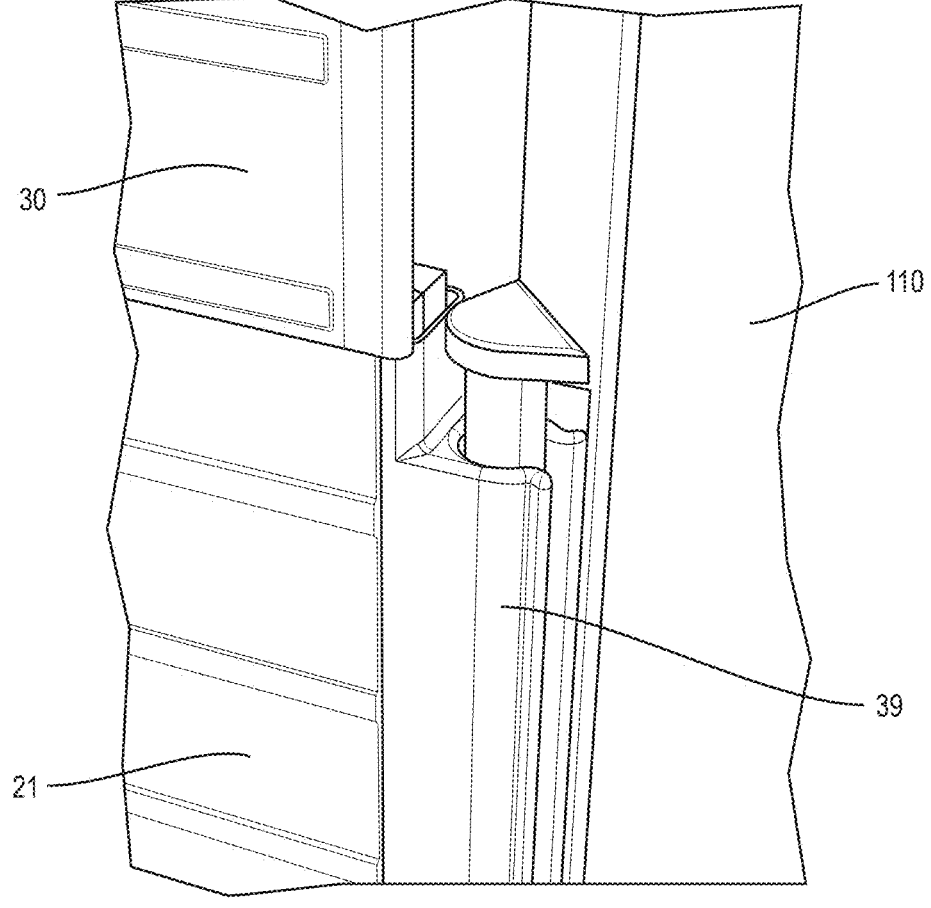
FIG. 6A is partial isometric view of a bearing fitting mounted to a monument and
  supporting panels of a barrier.

In some examples, one or more bearing fittings 39 are mounted to one or more monuments 110 to support the barrier in the extended position. FIG. 6A illustrates an example with a bearing fitting 39 positioned along a lateral edge of one or more of the panels 21. The bearing fitting 39 is configured to support an edge of the fitting 30.

The number and positioning of the bearing fittings 39 can vary. In some examples, a single bearing fitting 39 supports the barrier. In other examples, two or more bearing fittings 39 support the barrier.

In some examples, the barrier assembly 20 is used as a barrier system to prevent and/or delay a passenger in the cabin area 103 from moving through the opening 90 and gaining access to the flight deck 102. For example, as illustrated in FIG. 2, the barrier assembly 20 is positioned at a forward section of the cabin area 103. The barrier assembly 20 prevents the passenger from reaching the flight deck 102 or slows their movement to provide time for flight personnel to move into the flight deck 102 and secure the flight deck door 109.

The panels 21 include a forward side (e.g., that faces towards the flight deck 102 in the deployed position) and a rear face that faces towards the seating area. In some examples, the fittings 30 and dampeners 40 are positioned on one side of the panels 21. For example, on the forward side of the panels 21 that face towards the flight deck 102. This forward positioning prevents a passenger from accessing the fittings 30 and dampeners 40 to force the fittings 30 downward in an attempt to get past the deployed barrier assembly 20.

In some examples, locks 50 prevent the fittings 30 from being moved downward. In some examples, the locks 50 are mechanism fasteners that engage with the panels 21 and prevent the fittings 30 from moving downward relative to the panels 21. In other examples, the locks 50 are passively engaged when the barrier assembly 20 is moved to the deployed position. FIG. 6 illustrates locks 50 that engage with the respective fittings 30. The locks 50 include a first lockout feature 51, a rod 52, and a second lockout feature 53.

Figure 7:
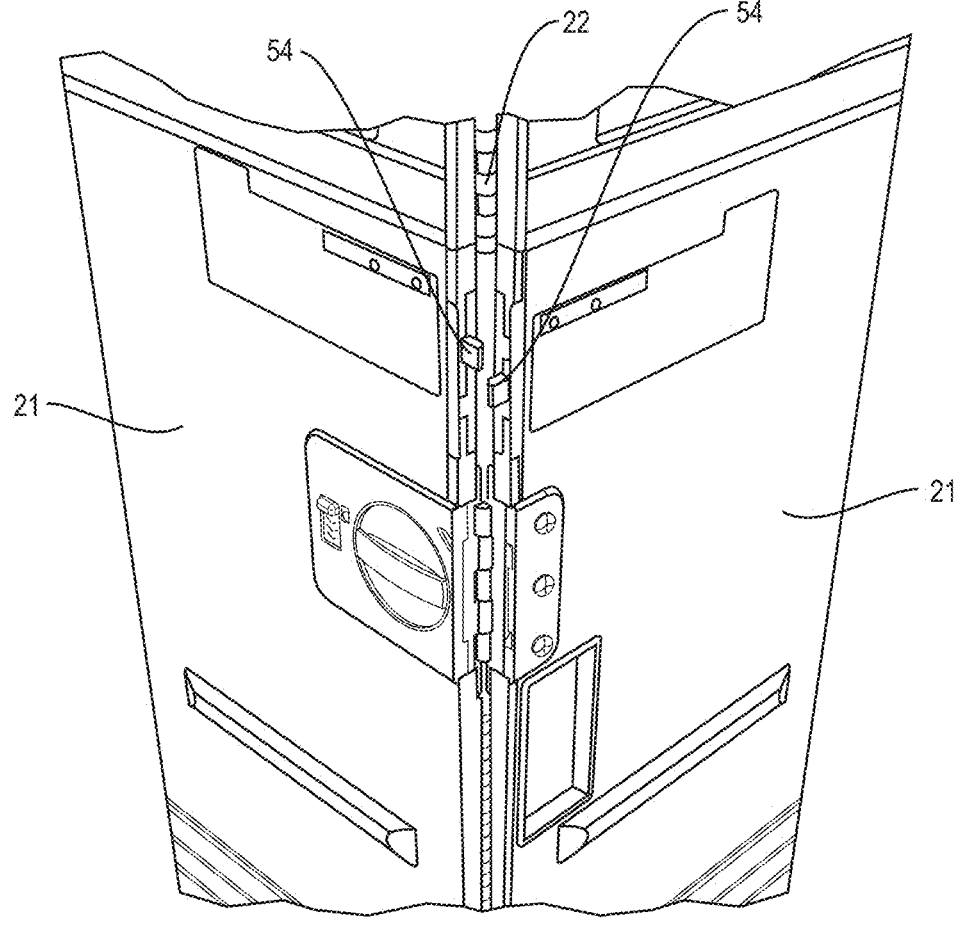
FIG. 7 is an isometric view of fingers that extend outward from inner edges of panels when the panels are opened along a hinge.
Figure 8:
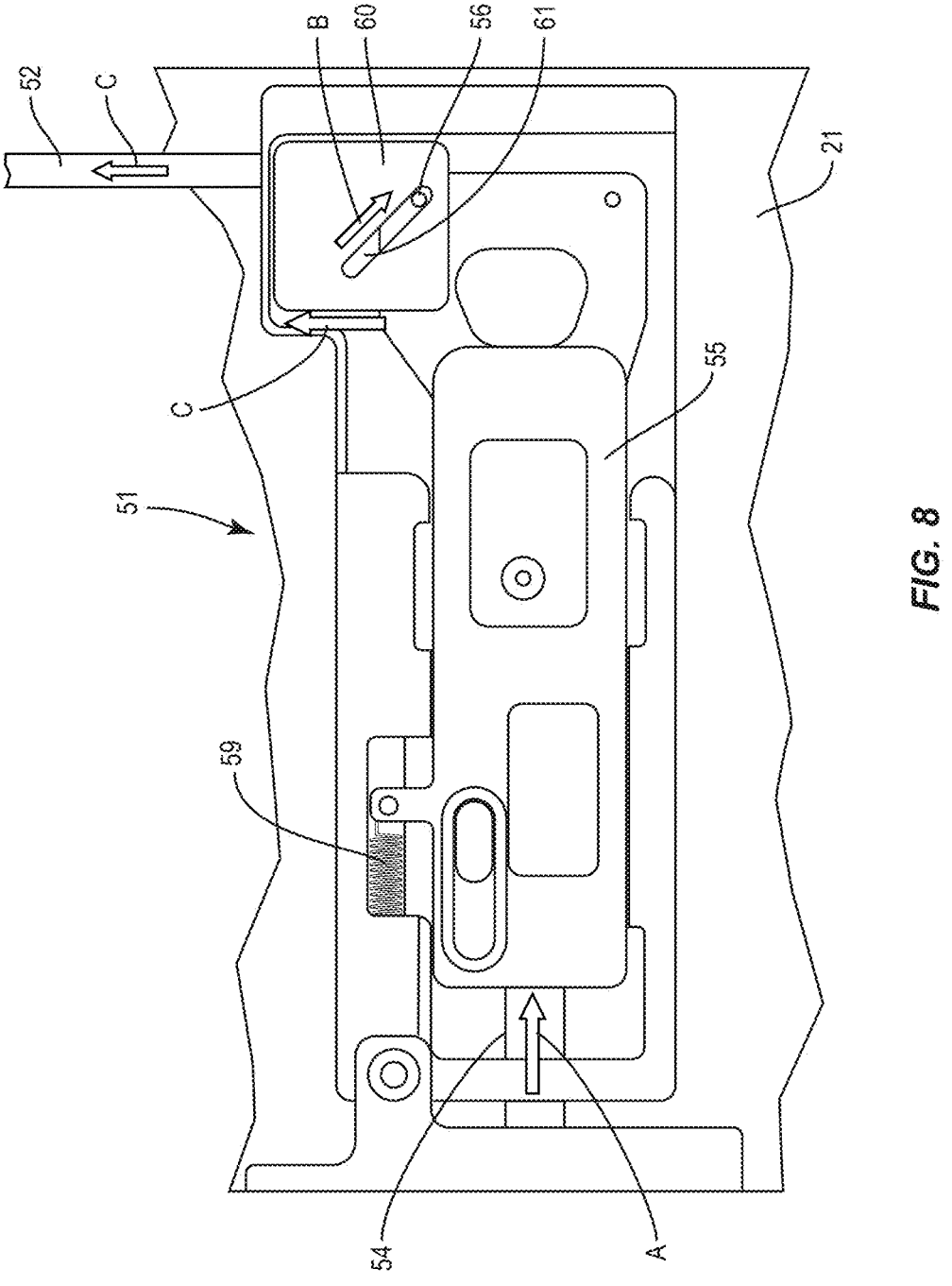
FIG. 8 is a side view of a portion of a lock.

As illustrated in FIGS. 7 and 8, the first lockout feature 51 includes a finger 54 and is connected to a body 55. The finger 54 and body 55 are biased in a first direction by a spring 59 to position the end of the finger 54 outward beyond an inner edge of the panel 21. When the panels 21 are moved to the deployed position, the inner edge of the opposing panel 21 contacts against and forces the finger 54 and body 55 in a direction indicated by arrow A. The first lockout feature 51 also includes a block 60 that is connected to the rod 52. A pin on the body 55 rides in a slot 61 in the block 60.

When the body 55 is forced in the direction of arrow A, pin 56 slides along the slot 61 as shown by arrow B. The movement of the pin 56 along the slot 61 causes the block 60 and attached rod 52 to move upward shown by arrow C.

Figure 9A:
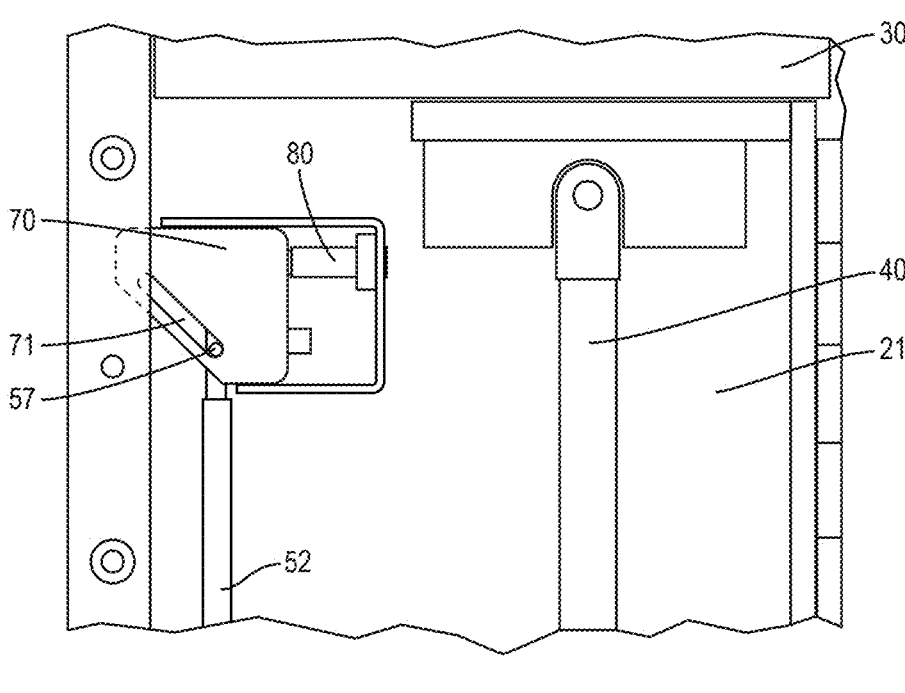
FIG. 9A is a side view of a second portion of a lock in a first position.
Figure 9B:
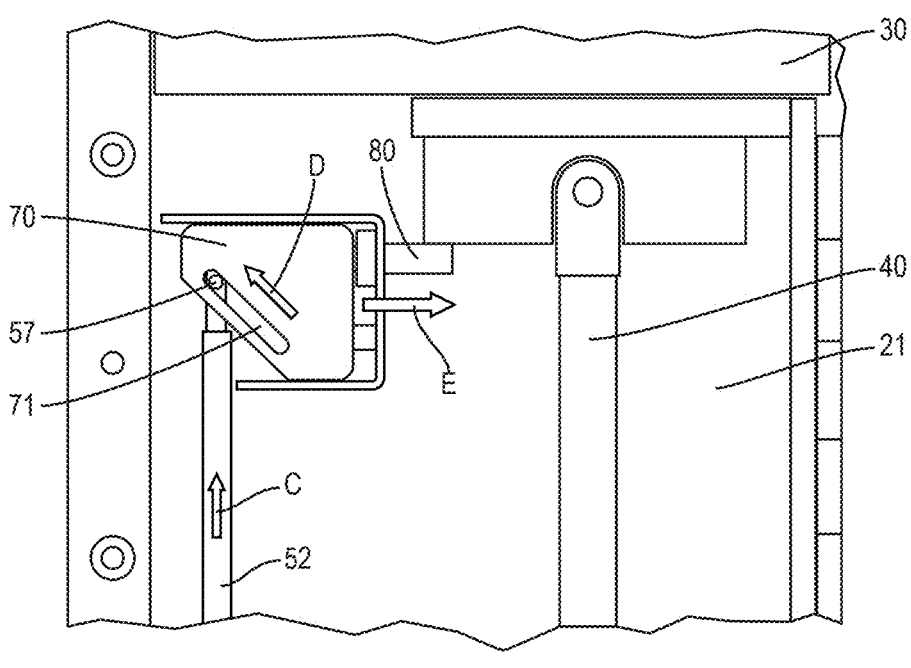
FIG. 9B is a side view of the lock of FIG. 9A in a second position.

As illustrated in FIGS. 9A and 9B, the rod 52 includes a pin 57 that fits into a slot 71 in a block 70. The block 70 includes a plunger 80 that extends outward from one side. As illustrated in FIG. 9B, movement of the rod 52 in the direction of arrow C causes the pin 57 to slide along the slot 71 as indicated by arrow D. This sliding movement causes the block 70 to move laterally as illustrated by arrow E. The movement of the block 70 moves the plunger 80 outward and underneath the fitting 30. This positioning of the plunger 80 underneath the fitting 30 prevents a passenger from forcing the fitting downward 30 relative to the panel 21 in an attempt to move past the barrier assembly 20.

The lock 50 is unlocked by unfolding the panels 21 and enabling the first lockout feature 51 to laterally move in the opposing direction indicated by arrow A in FIG. 8. This movement causes the rod 52 to move downward resulting in the plunger 80 retracting and enabling the fitting 30 to move downward from the extended position.

The barrier assembly 20 can be positioned in the cabin area 103 in various positions. In one example, the barrier assembly 20 is connected to side of a monument 108. This enables the barrier assembly 20 to be installed in existing aircraft 100. In one specific example, the barrier assembly 20 connects to the monument 108 with a tongue-and-groove arrangement that provides for quick attachment. These two components including mating elements with one having a long profiled protrusion (i.e., tongue) that mates with a long-profiled groove on the other component.

Figure 10:
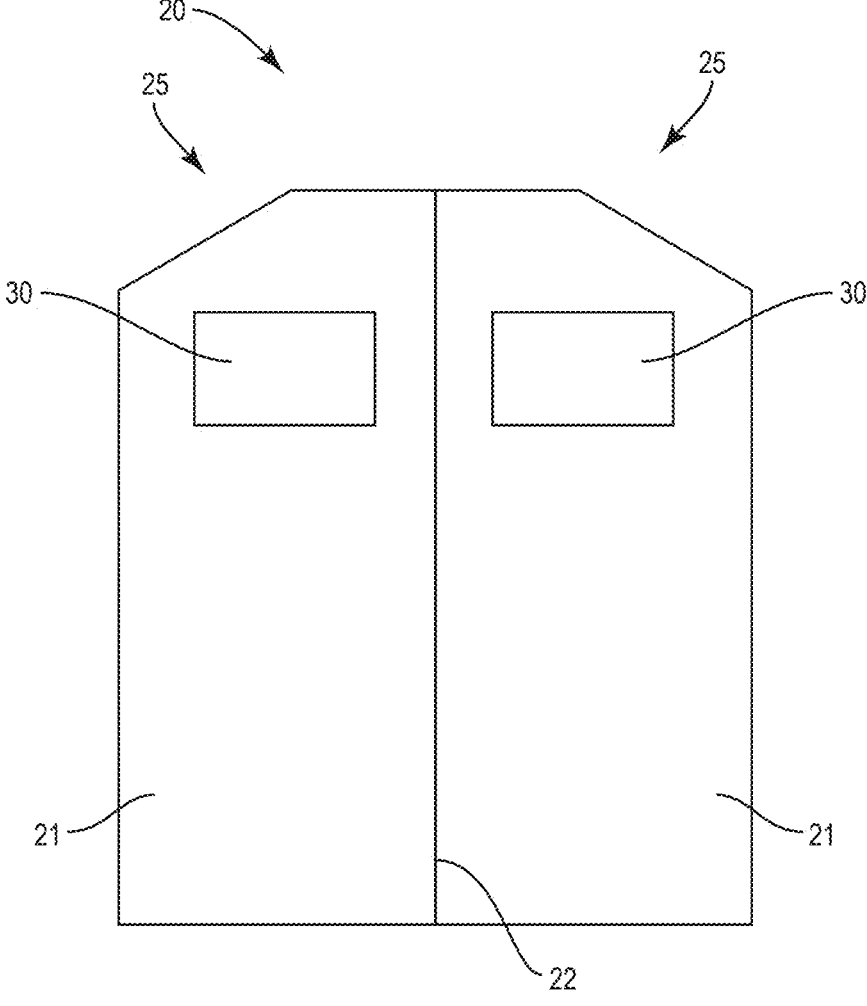
FIG. 10 is a side schematic view of a barrier assembly.

In some examples as disclosed in FIG. 6, the barrier assembly 20 includes a lock 50 to secure the fittings 30 in the extended position. In other examples as illustrated in FIG. 10, the barrier assembly 20 does not include a lock.

The number of panels 21 that form the barrier in the barrier assembly 20 can vary. In some examples as disclosed above, the barrier includes a pair of panels 21. In other examples, the barrier includes three or more panels 21. These panels 21 are pivotally connected together and configured to move between the stowed and deployed positions.

Figure 11:
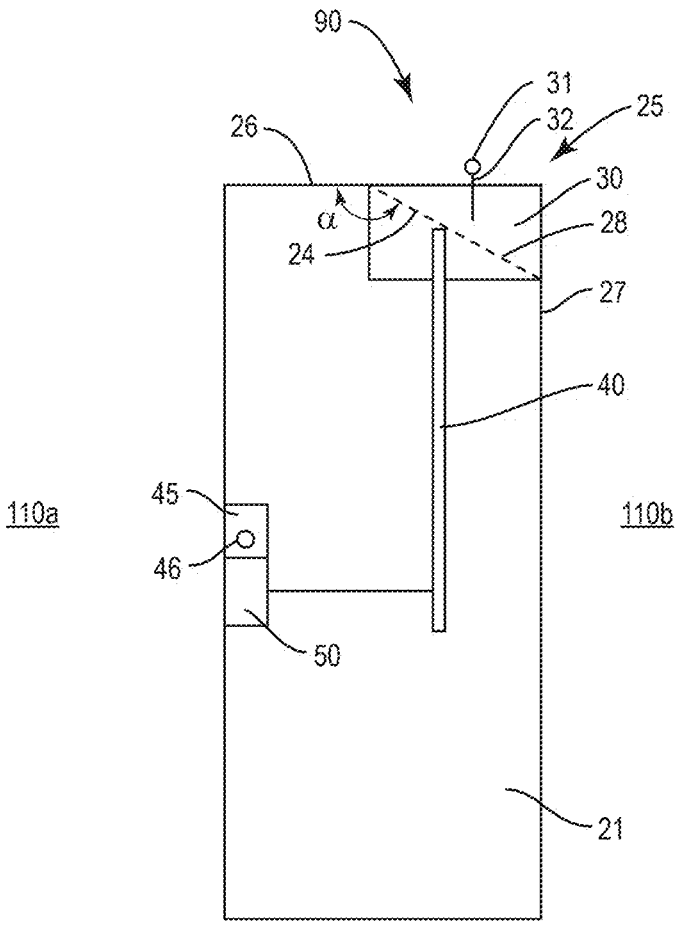
FIG. 11 is a schematic side view of a barrier assembly with a barrier that includes a single panel.

In some examples as illustrated in FIG. 11, the barrier of the barrier assembly 20 is formed by a single panel 21. The panel 21 is sized to extend across the opening 90, such as one that is formed between monuments 110a, 110b. The panel 21 includes the notched corner 25 that includes an angled edge 28 that extends between an upper edge 26 and outer lateral edge 27. The notched corner 25 enables the panel 21 to be stowed at the monument 110b to be out of the opening 90. A fitting 30 is mounted to the panel 21 to be selectively positioned relative to the corner 25. A lock 25 is configured to engage with the monument 110a in the locked position. The lock 25 is further configured to lock the fitting 30 when the barrier is in the deployed position.

In some examples, the barrier of the barrier assembly 20 includes a lock 45 to engage with a monument 110 and secure the barrier in the deployed position. The lock 45 includes an extension such as but not limited to a plunger, hook, or finger that engages with the monument 110. FIG. 4 illustrates an example with a barrier that is connected to and stored at a monument 110b in the stowed position. A lock 45 is mounted on the outer panel 21 and configured to engage with monument 110a to secure the barrier in the deployed position. The lock 45 includes a handle 46 to move between locked and unlocked positions. In some examples, the handle 46 is positioned on the same side of the panel 21 as the fitting 30. This prevents access to a passenger when the barrier is in the deployed position.

In some examples as illustrated in FIG. 4, the lock 45 is separate from lock 50. In other examples as illustrated in FIG. 11, lock 45 is combined with lock 50.

Figure 12:
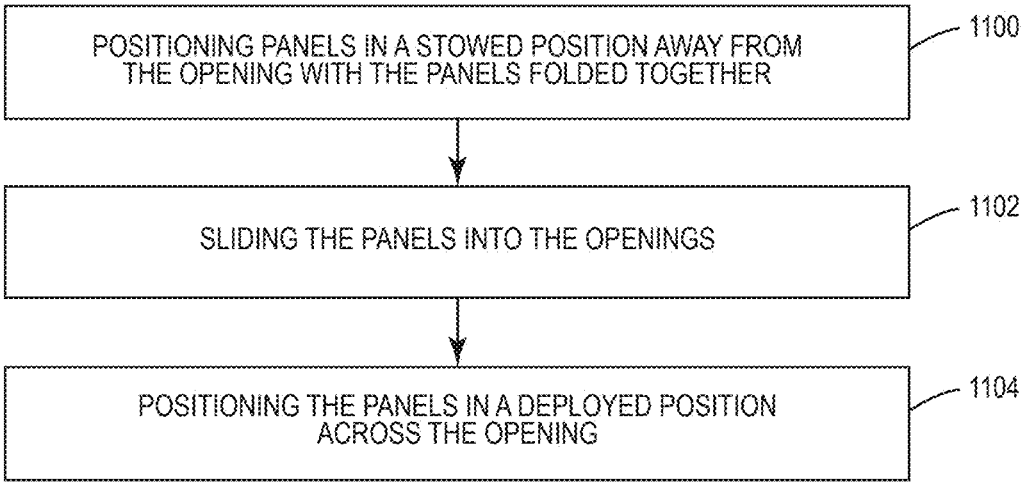
FIG. 12 is a method of using a barrier assembly within an opening in an interior of an aircraft.

FIG. 12 illustrates a method of using a barrier assembly 20 within an opening 90 in an interior of an aircraft 100. The panels 21 of the barrier assembly 20 are in a stowed position away from the opening 90 with the panels 21 folded together (block 1100). Notched corners 25 of the panels 21 are aligned together and positioned away from the opening 90 and with fittings 30 on the panels in retracted positions. The panels 21 are slid into the opening 90 (block 1102). This moves the fittings 30 from the retracted positions towards extended positions over the notched corners 25. The panels 21 are positioned in the deployed position across the opening 90 (block 1104). The panels 21 are extended outward and the fittings 30 extend across the notched corners 25.

One advantage of the barrier assembly 20 is the fittings 30 are passively moved to the extended positions when the panels 21 are unfolded from the stowed position and moved to the deployed position across the opening 90. Flight personnel are not required to take an active action to cause the fittings 30 to move to the deployed position. In some examples, this provides for a faster deployment as the flight personnel are not required to first shut the panels 21 and then move the fittings 30. Likewise, the fittings 30 passively move from the extended positions to the retracted positions when the panels 21 are moved back to the stowed position.

By the term "substantially" with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A barrier assembly that is configured to be mounted at an opening in an interior of an aircraft, the barrier assembly comprising: a panel with a notched corner; a fitting that is connected to and movable relative to the panel between a retracted position that exposes the notched corner and an extended position that extends across the notched corner.

2. The barrier assembly of claim 1, wherein in the notched corner is positioned between an upper edge and a lateral edge of the panel.

3. The barrier assembly of claim 1, further comprising: a biasing mechanism that is attached to the panel and that biases the fitting towards the extended position.

4. The barrier assembly of claim 3, further comprising: a lock mounted to the panel and configured to maintain the fitting in the extended position.

5. The barrier assembly of claim 4, wherein the panel comprises a first side and a second side and wherein the fitting and the biasing mechanism are mounted to the first side of the panel.

6. A barrier assembly that is configured to be mounted at an opening in an interior of an aircraft, the barrier assembly comprising:
a first panel and a second panel that are pivotally connected together, each of the first panel and the second panel comprising a notched corner;

fittings connected to the first panel and the second panel, the fittings movable relative to the panels between a retracted position that exposes the notched corner and an extended position that extends across the notched corner;
biasing members that bias the fittings towards the extended positions;
wherein the first panel and the second panel are movable between a stowed position and a deployed position;
wherein the stowed position comprises the first panel and the second panel in an overlapping arrangement with the notched corners being aligned; and
wherein the deployed position comprises the first panel and the second panel in a side-by-side arrangement to form a barrier with the notched corners positioned along upper and outer edges of the barrier.

7. The barrier assembly of claim 6, wherein the first panel and the second panel comprise a top edge and an angled edge that are straight and with the top edge and angled edge aligned at an obtuse angle.

8. The barrier assembly of claim 6, further comprising a hinge that connects together the first and second panels along inner edges of the first and second panels.

9. The barrier assembly of claim 6, wherein the first panel and the second panel comprise a common shape and size.

10. The barrier assembly of claim 6, further comprising rollers connected to and positioned outward from the fittings to contact against a structural member above the first and second panels when the first and second panels are in the deployed position.

11. The barrier assembly of claim 6, further comprising locks that prevent the fittings from being moved from the extended position to the retracted position.

12. The barrier assembly of claim 11, wherein the locks comprise plungers that extend outward from inner edges of the first and second panels in the stowed position and that are retracted inward to engage the locks when the first and second panels are in the deployed position.

13. The barrier assembly of claim 6, wherein the fittings overlap with the respective first and second panels in the stowed position and the deployed position.

14. The barrier assembly of claim 6, wherein the fittings and the biasing members are positioned on forward sides of the first and second panels to prevent access to passengers on the aircraft sitting in a cabin area of the aircraft.

15. A method of using a barrier assembly within an opening in an interior of an aircraft, the method comprising:
positioning panels of the barrier assembly in a stowed position away from the opening with the panels folded together with notched corners of the panels aligned together and positioned away from the opening and with fittings on the panels in retracted positions;
sliding the panels into the opening and moving the fittings from the retracted positions towards extended positions over the notched corners; and
positioning the panels in a deployed position across the opening with the panels extended outward and the fittings extending across the notched corners.

16. The method of claim 15, further comprising sliding the panels into the opening and moving rollers along a track and gradually moving the fittings over the notched corners.

17. The method of claim 15, further comprising sliding the panels into the opening and passively moving the fittings from the retracted positions towards the extended positions.

18. The method of claim 15, further comprising overlapping the fittings on the panels in the retracted positions with the fittings located away from the notched corners.

19. The method of claim 15, further comprising locking the fittings in the extended positions when the panels are deployed across the opening.

20. The method of claim 15, further comprising positioning the panels in a parallel arrangement in the stowed position.

\* \* \* \* \*